US008887685B2

(12) United States Patent
Beck

(10) Patent No.: US 8,887,685 B2
(45) Date of Patent: Nov. 18, 2014

(54) METHOD AND APPARATUS FOR TUNING AN ENGINE BY MODIFYING POD FILTER AND METHOD OF CALIBRATION

(76) Inventor: Kenneth Dean Beck, Baltimore, MD (US)

( * ) Notice: Subject to any disclaimer, the term of this patent is extended or adjusted under 35 U.S.C. 154(b) by 0 days.

(21) Appl. No.: 13/595,553

(22) Filed: Aug. 27, 2012

(65) Prior Publication Data
US 2013/0220258 A1    Aug. 29, 2013

Related U.S. Application Data

(60) Provisional application No. 61/527,348, filed on Aug. 25, 2011.

(51) Int. Cl.
*F02M 35/10* (2006.01)
*F02M 35/02* (2006.01)
*B01D 46/00* (2006.01)
*F02B 77/00* (2006.01)
*B01D 46/24* (2006.01)
*F02M 35/024* (2006.01)
*F02B 27/00* (2006.01)
*F02M 35/112* (2006.01)

(52) U.S. Cl.
CPC .......... *F02B 77/00* (2013.01); *F02M 35/10347* (2013.01); *F02M 35/0207* (2013.01); *Y02T 10/146* (2013.01); *F02M 35/10262* (2013.01); *F05C 2225/08* (2013.01); *F02M 35/112* (2013.01); *B01D 46/0047* (2013.01); *F02M 35/10144* (2013.01); *B01D 46/2411* (2013.01); *F02M 35/10321* (2013.01); *F02M 35/02483* (2013.01); *F02B 27/005* (2013.01)

USPC ..................................... 123/184.21

(58) Field of Classification Search
CPC ................. F02M 35/10321; F02M 35/10144; F02M 35/112; F02M 35/10347; F05C 2225/08
USPC ..................................... 123/184.21
See application file for complete search history.

(56) References Cited

U.S. PATENT DOCUMENTS 3,429,108 A  *  2/1969  Larson ........................... 55/432
2008/0156720 A1 *  7/2008  Ohashi ......................... 210/442

OTHER PUBLICATIONS

Simota Shielded Filter, Simota.com.au.*

* cited by examiner

*Primary Examiner* — Lindsay Low
*Assistant Examiner* — Charles Brauch
(74) *Attorney, Agent, or Firm* — Ober, Klaer, Grimes & Shriver; Royal W. Craig

(57) ABSTRACT

A method and apparatus for tuning an engine by a modified pod filter or velocity stack using a tunable pod air filter with base and cap members forming a housing that is joined together by a filter membrane to define a plenum or resonance chamber within the housing that contains only air drawn in through the filter. An aperture in the base member passes air to the inlet of an engine. A tuning sleeve is sealingly engaged within the aperture and extends into the plenum to control air flow out of the plenum and into the engine. The tuning sleeve is tubular with a pattern of vents through its surface to control flow rate. The vents may be drilled, punched or otherwise cut through the sleeve to control air flow. After being vented, the sleeve is reinserted into the filter housing and the filter is installed on the engine.

10 Claims, 3 Drawing Sheets

METHOD AND APPARATUS FOR TUNING AN ENGINE BY MODIFYING POD FILTER AND METHOD OF CALIBRATION

CROSS-REFERENCE TO RELATED APPLICATION(S)

The present application derives priority from U.S. provisional application Ser. No. 61/527,348 filed: Aug. 25, 2011.

BACKGROUND OF THE INVENTION

1. Field of the Invention

The present invention generally relates to air filtration systems and, more particularly, to tunable air filtration systems for combustion engines, such as vehicle engines.

2. Description of the Background

Internal combustion engines operate on well known principles. A piston compresses an air-fuel mixture in a cylinder. The mixture is ignited to rapidly increase the temperature and pressure in the cylinder which displaces the piston thereby converting the chemical energy of the fuel into kinetic mechanical energy capable of doing work. The power output of the engine, i.e. the rate at which work is performed or energy is converted, is a function of many variables, including in particular, the relative and absolute component quantities of the fuel-air mixture in the cylinder.

In multi-cylinder engines, fuel is typically delivered to the cylinders from the fuel tank by individual carburetors or pressurized fuel injectors. Outside air is drawn in and delivered to the carburetors through an air intake system. Older engines draw air directly from the surroundings into each individual carburetor. However, most modern engines instead draw air into a plenum or "air box" which is connected by individual hoses to each carburetor, or directly to the intake ports in fuel-injected engines. This allows the use of a single air filter provided between the outside air and inside of the plenum or air box to remove particulate matter that may damage the engine. Designers design carefully-calibrated air boxes and manifolds to ensure the free flow of air to the engine under all operating conditions, so as not to negatively impact engine performance if proper quantities of air cannot be delivered to each cylinder. This applies to 99% of all motorcycles.

Vintage Modern motorcycle air boxes and certain modern motorcycle air boxes are large and unsightly, difficult to remove and reinstall as is necessary in order to perform certain maintenance on the carburetors and the engine, and are expensive to replace. Consequently, it is not uncommon for operators to remove the air box altogether so as to let each cylinder "breath" outside air directly through the carburetor. As a result, air is no longer controlled restricted by the confines of the air box, but is also no longer filtered by the air filter. The same is true for motorcycles employing aftermarket velocity stacks. Velocity stacks are fluted intake ports at each carburetor that employ no filtration, and give an aesthetically pleasing organ pipe appearance. As an alternative to the unfiltered approach, "pod" filters may be provided. Pod filters are typically cylindrical or conical shaped filters and have paper, mesh or foam elements that offer minimal resistance to air flow and will be familiar to one skilled in the art. Although the majority of pod filters are individual pod filters provided at each cylinder inlet or carburetor inlet, some are designed to accommodate either two or four carburetors.

Unfortunately, current direct intake pod filters and velocity stacks suffer from some deficiencies, particularly when used with motorcycle engines. First, without the protection of the air box, the filter is susceptible to tuning issues from ambient conditions such as side winds or rain that alter the filter's ability to pass air to the engine and thus alter the engine's performance. Second, without the air flow control of the air box, too much air can be provided to the engine upsetting the air-fuel mixture balance. It is commonly necessary to replace jets of the carburetor(s) (or "rejet the carbs") to attempt match the new air flow characteristics of a bike that has had conventional pod type filters installed in place of the OEM air box and filter. Aftermarket velocity stacks must also match the new air flow characteristics of a bike that was designed for an OEM air box. In both cases rejetting is a very complicated and time-consuming procedure which could be avoided with a tunable pod filter/velocity stack that gives control over the airflow provided to the engine.

What is needed is a more convenient tunable pod filter for combustion engines, and particularly motorcycle engines, and a, method for tuning the pod filter that eliminates the need for rejetting the carburetors when replacing stock air box filters with pod filters.

SUMMARY OF THE INVENTION

It is, therefore, an object of the present invention to provide a method and apparatus for tuning an engine by a pod type internal combustion engine air filter that is readily tunable as to air flow volume, and a method of calibration of the same.

It is another object of the present invention to provide a pod type internal combustion engine air filter that is not susceptible to flow volume variations as a result of ambient conditions such as wind and rain.

It is yet another object of the present invention to a tunable pod type internal combustion engine air filter that is easily removed and replaced for ease of access to underlying engine parts such as a carburetor.

It is yet another object to provide a velocity stack that is readily tunable as to air flow volume similar to the foregoing.

According to the present invention, the above described and other objects are accomplished, by a method and apparatus for tuning an engine using a tunable pod-type air filter and methods for calibration thereof. The tunable air filter according to an exemplary embodiment of the present invention, much like a conventional pod type filter, is provided with base and cap members forming a housing that is joined together by a filter membrane to define a plenum or resonance chamber within the housing that contains only air drawn in through the filler. An aperture is provided in the base member to pass air to the inlet of an engine whether directly to the cylinder or, more commonly, through a carburetor inlet. A neck is provided extending from the base member for sealed engagement with the engine. A perforable tuning sleeve is sealingly engaged within the aperture and extends into the plenum to control air flow out of the plenum and into the engine via the aperture. The tuning sleeve may be, for example, a tubular closed-ended plastic (or other perforable material) member defined by a predetermined pattern of holes or vents through its cylindrical walls. The predetermined pattern of holes is calibrated in accordance with the tuning process described herein to control the flow rate of filtered air out of the plenum through the open area of the vents. The pattern of holes is determined in accordance with one of several methods described herein to control the flow rate of filtered air and the area opened by the vents. One exemplary method of providing an adjustable pod type filter entails determining the factory-specified flow characteristics for each cylinder, and forming a corresponding pattern of holes in the tuning sleeve which control the flow rate of filtered air and the area opened by the vents (the holes may be drilled, punched or otherwise perforated through the tuning sleeve). The pattern of holes defines the proper flow characteristics for each cylinder in accordance with the factory specified desired flow characteristics. After being vented, the sleeve is inserted into the filter housing and the filter is installed on the engine. Because the vents are perforated so as to have the proper area as previously determined for the particular engine to which it is installed, the tuned filter provides the requisite air flow characteristics matched to each cylinder of the engine. One skilled in the art should understand that the foregoing method and apparatus for tuning an engine is equally applicable to the use of a velocity stack that is readily tunable in the same manner so as to provide proper flow characteristics for each cylinder similar to the foregoing.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
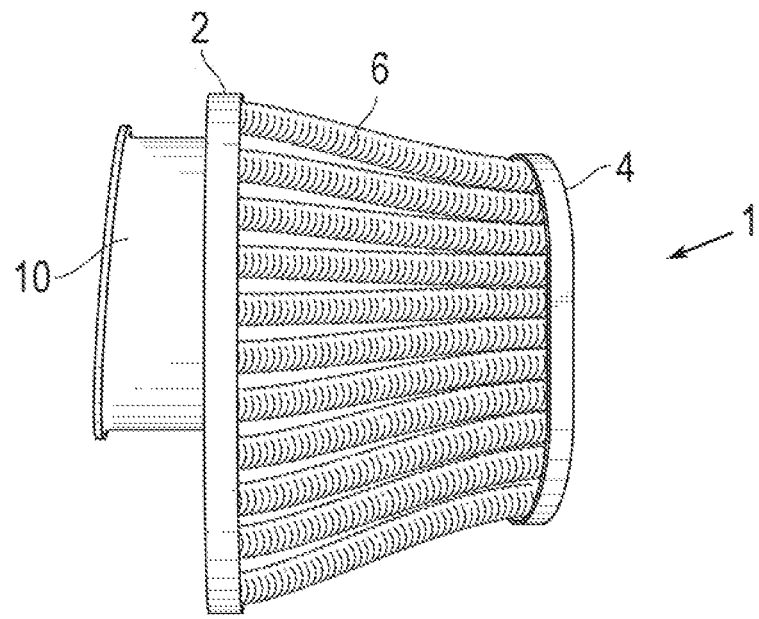
FIG. 1 is side view of a pod filter according to the present invention.

With reference to FIG. 1, a pod type air filter 1 is depicted having a housing including a base member 2 and a cap member 4. The base member 2 and cap member 4 are joined by a filter medium 6. The base member 2 and cap member 4 are generally planar elements preferably circular or ovoid in form with the cap member 4 being of a smaller diameter than the base member such that the filter 1 is characterized by a frustoconical shape. It should be understood that the relative sizes and shapes of the cap member 4 and base member 2 may be other than as illustrated such that the overall filter may be characterized as a cylinder, an inverted frustoconical shape, or otherwise.

The base member 2 is provided with a typically circular hole or aperture S through which filtered air is delivered to a cylinder intake. A flange or neck 10 encircles the aperture and extends from the surface of the base member 2. The neck 10 may be straight or angled relative to the base member and is preferably adapted for direct engagement with the inlet of the throttle body (part of the air intake system by which air flows into the carburetor(s). The neck 10 is in sealed engagement with the carburetor air inlet. The neck 10 may be of singular unitary construction and preferably made of a strong, resilient and solvent resistant material such as plastic, rubber or other polymer. The cap 4 is un-perforated, and as with base member 2 will typically be made of metal material and most preferably chromed metal for aesthetic appeal.

The filter medium 6 spans the base member and cap member and may be of any known air filter medium such as woven or non woven natural and synthetic fibers, foam or a combination thereof and may be pleated or folded to maximize surface area. The filter medium 6 is sealingly joined to the base member 2 and cap member 4 such that any air entering the resonance chamber 12 within the housing must pass through the filter medium 6. The resonance chamber defines the space within the housing and represents the volume of air available to be drawn into the cylinder through the filter medium 6. For present purposes the air flow of the filter medium 6 is presumed to be nominally low, although it may at times be desirable to control the flow of air into the cylinder by increasing the resistance of the filter medium 6.

Figure 2:
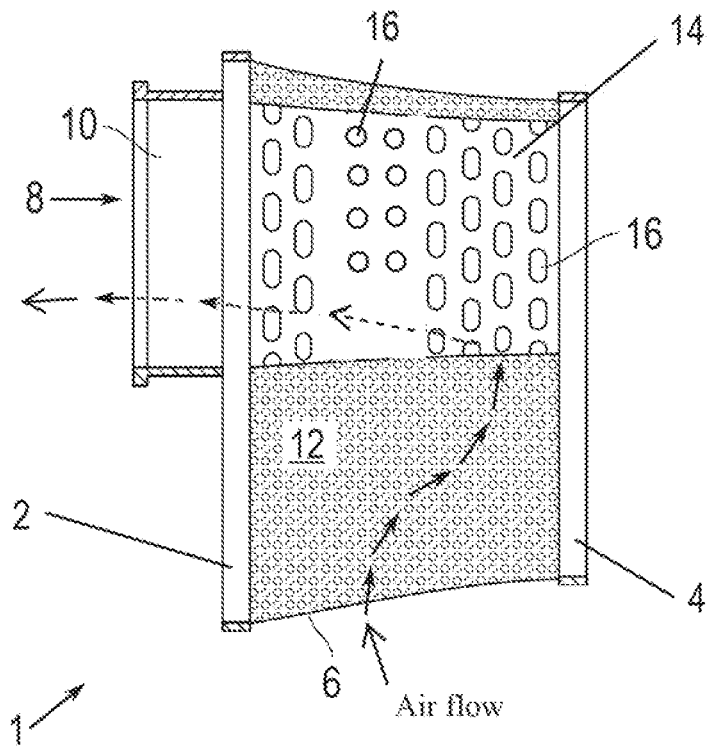
FIG. 2 is section of a pod filter according to the present invention.
Figure 3:
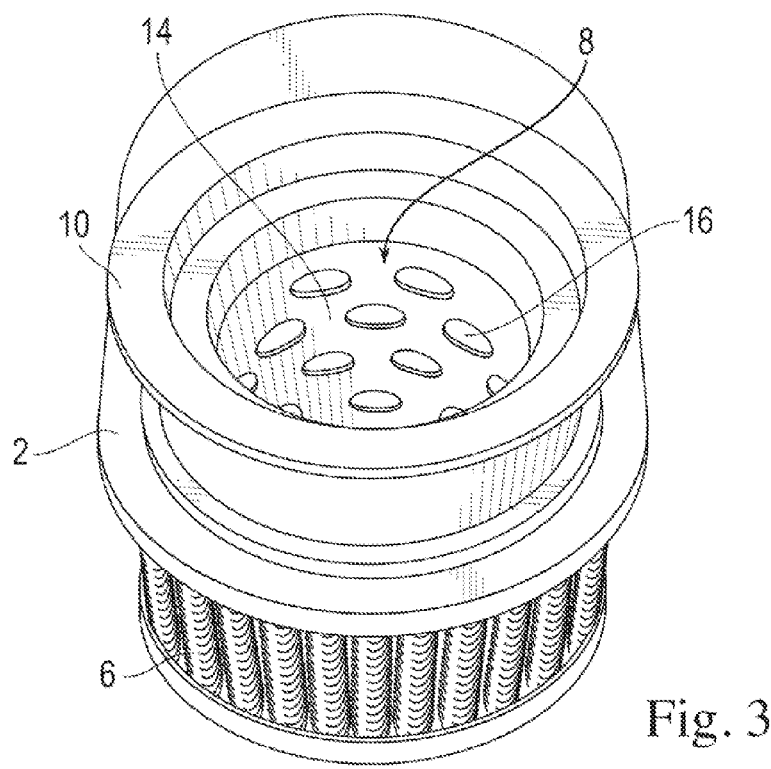
FIG. 3 is a base end view of a pod filter according to the present invention.
Figure 4:
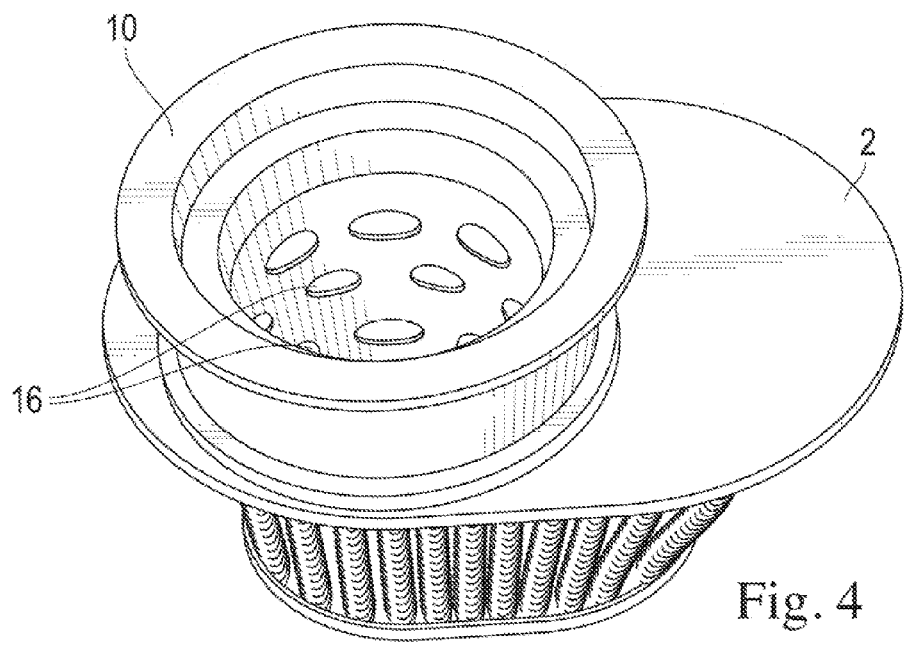
FIG. 4 is a base end view of a pod filter according to the present invention.
Figure 5:
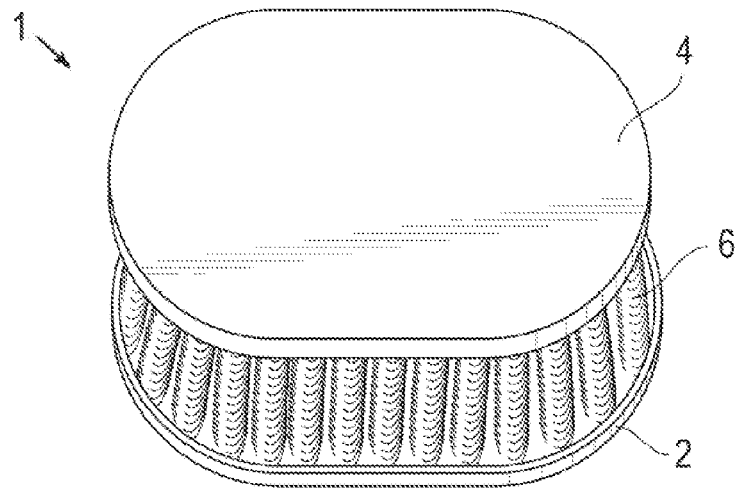
FIG. 5 is cap end view of a pod filter according to the present invention.

With reference to FIG. 2, in a preferred embodiment a tuning sleeve 14 is provided within the resonance chamber in order to modify the airflow characteristics of the air filter 1. The tuning sleeve 14 is preferably a perforable tubular member defining a plenum within the resonance chamber. One end of the tubular tuning sleeve 14 is closed, for example, engaged to and sealed by the inside surface of the cap 4. Alternately, where the tuning sleeve 14 does not extend to the cap, the sleeve may be provided with an end plate to seal the end of the sleeve 14 within the resonance chamber. In some embodiments the end of the resonance chamber within the plenum may be fully or partially open. The opposite end of the tubular tuning sleeve 14 is situated within the aperture 8 and is sealingly engaged to the neck 10 such that air within the resonance chamber 12 must enter the tuning sleeve 14 in order to pass out the aperture 8 and through the neck 10. In order to permit airflow out of the resonance chamber and into the tuning sleeve 14 (and ultimately out of the filter 1 altogether through the aperture,) the cylindrical walls of the tuning sleeve 14 are perforated by a predetermined pattern of vents 16, the pattern being determined in accordance with the tuning process described below to control the flow rate of filtered air out of the plenum in accordance with the open area of the vents 16.

The vents 16 are preferably annularly positioned around the sleeve 14 and may be circular, ovoid, linear or another shape of known area. Multiple rows of annularly positioned vents may be provided to meet the air flow requirements as will be described. In some embodiments of the present invention the tuning sleeve 14 is fixed within the filter 1 with a set number and pattern of vents and cannot be replaced or adjusted. In an alternate embodiment, the filter 1 can be disassembled by removal of the base member 2 or the cap member 4, allowing the entire sleeve 14 to be removed. The sleeve 14 can then be modified or replaced by a similar sleeve 14 having a different pattern of vents 16 in order to alter the airflow characteristics of the filter 1. In another embodiment the tuning sleeve 14 may be comprised of inner and outer sleeves having complimentary patterns of vents 16. In this embodiment the inner sleeve is slideable relative to the outer sleeve either in rotation or longitudinal translation such that the interaction between the complimentary pattern of holes in the inner and outer sleeves varies, in a known manner, to adjust the total open area of the vents 16 and thus air flow characteristics of the filter 1. The surfaces of the inner and outer sleeves may be marked or indexed to indicate the airflow characteristics at a given relative position between the sleeves. Once adjusted, the sleeves can be secured in place relative to one another to avoid unwanted changes in air flow. There are many potential embodiments of the present invention to control the flow of air into the carburetor or carburetors, the essence of the invention being air flow control rather than carburetor jetting or some other method to provide tuning for a given engine application. Again one skilled in the art should understand that the foregoing method can be readily adapted to a velocity stack by specifically locating the filter cap 22, in order to size the resonance chamber and to insert a control baffle 23, in a conventional aftermarket velocity stack, to be readily tunable in the same manner.

The present invention also includes a novel process for tuning an engine by calibration of the modified pod filter as described above. The first step in the process is to determine requisite air flow for each cylinder. There are several methods to determine the correct air flow for any given carburetor set up. For example, this step can be accomplished through computation or by bench testing of an OEM air box and filter to measure it. Alternatively, the engine manufacturer may specify CFM (Cubic Feet per Minute . . . a standard measurement of airflow indicating how many cubic feet of air pass a point in one minute). Alternatively, proper CFM can be estimated by a general rule of 2.5 times the horsepower of the engine to get an approximate amount of air required. Alternatively, proper CFM can be calculated for various engine types in a known manner. For example, for a 4 cycle motor the cubic inch displacement of the engine can be multiplied by the maximum rpm (Revolutions Per Minute) and the result divided by 3456. The result is then multiplied by the volumetric efficiency of the engine (a factor determined by the efficiency of the turbo, the electronic control systems, the type of fuel injection and the variation of valve timing or opening). A carbureted engine normally has a volumetric efficiency of 0.70 to 0.80, but the electronics can raise this figure as high as 2.0. Various other calculations can be applied to determining the requisite air flow or vent size. In a preferred calculation, the air box filter area and inlet area of the air box that the pod filter or filters will replace are determined. By way of example, the airbox of a four-cylinder exemplary 1100 cc motorcycle has an inlet area of 2.5 square inches and a filter area of 36 square inches. Given knowledge of the filter area of a pod filter 1 in accordance with the invention, which can be quantitatively determined, it becomes possible to calculate the predetermined vent 16 pattern. For example, if the combined filter area of all pod filters 1 is approximately 90 square inches, then without tuning the combined filters will allow approximately 37 times ($90\ in^2/2.5\ in^2$) as much air into the carburetors as the original air box and filter combination (note that air flow increase is not directly proportional to vent area increase). Based on the foregoing calibration a pattern of vents 16 is perforated in the pod filter 1 sleeves 14 to reduce the airflow characteristics by a factor of 37 (bearing in mind that the total calibrated air flow is for all four cylinders; thus, the holes punched in each sleeve are designed to control only 25% of that total air flow). A 1/8 inch diameter hole has a 1/16 inch (0.0625 in.) radius and an area of 0.0123 sq. inches. Ten such holes have a combined total area of 0.123 square inches. Given additional knowledge of the airflow characteristic through one 1/8 inch hole, it is determined that each pod filter sleeve 16 should be perforated with ten 1/8 inch holes to reduce the total airflow characteristics by a factor of 37.

Once the number and area of vents 16 per sleeve 14 are determined, four tuning sleeves 14 each having the desired vent 16 area are selected (or unperforated sleeves 14 are perforated) and one each is inserted into each pod filter 1. In the presently preferred embodiment, the user is provided with a pre-formed tuning sleeve 14 designed to match the engine manufacturer's specifications. The user may optionally (and easily) modify the pre-vented sleeve if desired. Alternatively, the tuning sleeve 14 can be provided in an un-vented state and be vented by the user prior to installation in accordance with instructions also provided to the user. Still another alternate embodiment provides the user with multiple pre-vented sleeves 14 of differing areas such that the user can simply select the sleeve closest to the airflow determined to be needed. Further, in some embodiments, the sleeve 14 may be inserted through the aperture in the base member 2 via the neck while in other embodiments the cap member 4 is removed and the sleeve inserted before replacing the cap member 4. Where an adjustable flow tuning sleeve 14 is provided the sleeve need not be removed but rather the inner and outer sleeves slid/rotated relative to one another to achieve the desired vent area before being secured together. After the tuning sleeve 14 is installed, the filter 1 is installed at the carburetor inlet in the manner of conventional pod filter. A filter 1 of the present design has the added benefits of enabling the elimination of the air box and filter assembly saving weight and making it much easier to access the engine for maintenance, etc. Such a filter 1 also avoids the problems of conventional pod type filters such as reduced top end power, poor throttle response, and hard starting, particularly on carburetors equipped with modern cold start enrichment circuits in place of plate style choke mechanisms. Additionally, the resonance chamber 12 provides the added benefit of making the filter less susceptible to variations in ambient conditions such as rain and side winds by impounding a volume of air past the filter media.

Figure 6:
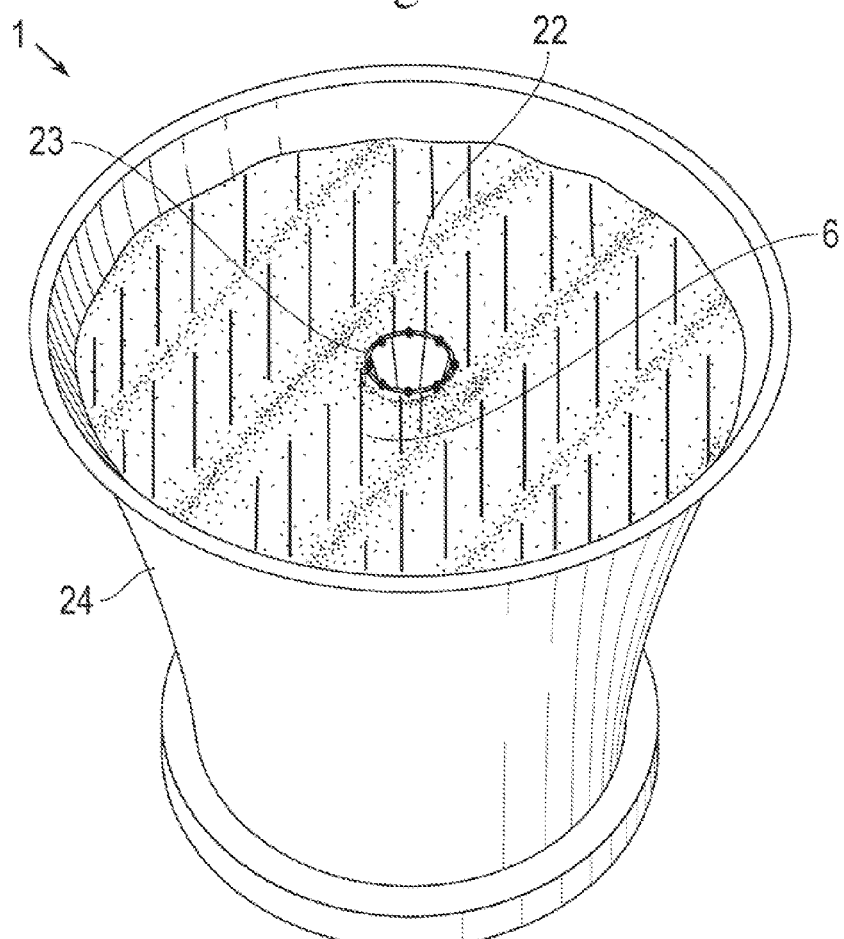
FIG. 6 is a view of an alternate embodiment of a pod filter according to the present invention.

With reference to FIG. 6, an alternate embodiment of the present invention in which the base member 2 and cap member 4 of the housing are replaced by a housing in the form of a conventional velocity stack. Filter media 6 may or may not be adapted to be affixed within the trumpet as shown. Rather than a tuning sleeve, a control baffle 22 is positioned within the flute of the velocity stack (directly below the filter member if provided). Airflow tuning is based on the location of the filter media within the trumpet and the size/porting of the control baffle 22 that defines an opening in the filter media. Alternately, the filter media 6 may itself form the control baffle, assuming the filter media porosity is restrictive of the airflow, the filter media may be defined by an appropriately-sized aperture defining a control baffle 23 (dotted lines), to increase airflow to said calibrated amount. The foregoing embodiments, operate on the same principles as the preferred embodiment but provides a smaller resonance chamber in the form of the radiused trumpet.

In yet another alternate embodiment the tuning sleeve is enlarged and positioned; outside the filter element which remains substantially in its previously described form. The externally mounted tuning sleeve is similarly provided with a series of vents to control flow and joins the cap member and base member. External positioning of the tuning sleeve is particularly beneficial for embodiments having adjustable now vents (as by sliding rotation of coaxial sleeves) as it is then possible to adjust the flow characteristics of the filter without removing it from the engine or even removing the cap to access an internal sleeve.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. A tunable air filter for an internal combustion engine, comprising:
 a. a housing, said housing further comprising a base member and a cap member, said base member having an aperture there through for passing filtered air to said engine intake, said aperture circumscribed by a cylindrical neck extending from a surface of said base member for sealed engagement with said engine, and said cap member being removable from said housing;

b. a filter element comprising a tubular filter media extending axially from an annular first end circumscribing said removable cap member to an annular second end circumscribing said base member and defining a plenum within said housing;

c. a tuning sleeve sealingly engaged within the aperture of said housing and extending into said plenum, said tuning sleeve comprising cylindrical walls conforming to the cylindrical neck and removably inserted therein, whereby said tuning sleeve is removable from said cylindrical neck and housing independent of said filter element by removal of said cap member, said tuning sleeve further comprising a plurality of vents there through collectively defining a calibrated total open area to permit the passage of a calibrated flow of filtered air from said plenum to said engine.

2. The tunable air filter according to claim 1, wherein the plurality of vents in said tuning sleeve further comprise at least ten ⅛" diameter circular perforations.

3. The tunable air filter according to claim 2, wherein said plurality of vents are uniformly spaced about the cylindrical walls of said tuning sleeve.

4. The tunable air filter according to claim 2, wherein said tuning sleeve further comprises inner and outer sleeves.

5. A method of providing a tunable air filter for an internal combustion engine, comprising the steps of:

providing a tunable air filter according to claim 1;

determining requisite air flow characteristics for said engine;

removing said cap member from said housing;

removing said tuning sleeve from said housing without removing said filter element, and altering the total open area of said vents to provide the requisite air flow characteristics;

reinstalling said tuning sleeve in said housing;

installing said air filter to an inlet of said engine.

6. An air filter apparatus, comprising:

a housing including a base member and a removable cap member defining a resonance chamber there between, said base member having an aperture and a cylindrical neck extending from said resonance chamber through the aperture of said base member for sealed engagement with said engine;

a filter medium sandwiched said base member and removable cap member; and a tubular tuning sleeve traversing said resonance chamber and defining a plenum within the resonance chamber, said tuning sleeve comprising cylindrical walls defined by a predetermined pattern of perforations that modify airflow through the air filter apparatus, the cylindrical walls of said tuning sleeve conforming to the cylindrical neck of said housing and removably inserted therein, whereby said tuning sleeve can be removed from said cylindrical neck and housing independent of said filter element by removal of said cap member.

7. The air filter apparatus according to claim 6, wherein said tuning sleeve abuts said cap and is closed thereby at one end.

8. The air filter apparatus according to claim 6, wherein the plurality of vents in said tuning sleeve further comprise at least ten ⅛" diameter circular perforations.

9. The air filter apparatus according to claim 8, wherein said plurality of vents are uniformly spaced about the cylindrical walls of said tuning sleeve.

10. The air filter apparatus according to claim 9, wherein said tuning sleeve further comprises inner and outer sleeves.

* * * * *